(12) United States Patent
Gati

(10) Patent No.: US 6,758,637 B2
(45) Date of Patent: Jul. 6, 2004

(54) CUTTING TOOL ASSEMBLY

(75) Inventor: Uzi Gati, Karmiel (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 09/873,331

(22) Filed: Jun. 5, 2001

(65) Prior Publication Data
US 2001/0053312 A1 Dec. 20, 2001

(30) Foreign Application Priority Data

Jun. 5, 2000 (IL) ................................................ 136564

(51) Int. Cl.⁷ .............................................. B23P 15/28
(52) U.S. Cl. ...................................... 407/92; 407/102
(58) Field of Search .............................. 407/102, 107, 407/110, 113, 114, 115, 116, 117, 411, 412, 92, 95, 96; 408/187, 188

(56) References Cited

U.S. PATENT DOCUMENTS

| | | | | |
|---|---|---|---|---|
| 3,846,882 A | * | 11/1974 | Stein .......................... 407/87 |
| 4,137,000 A | * | 1/1979 | Takacs et al. ................ 407/101 |
| 4,509,886 A | * | 4/1985 | Lindsay ....................... 407/102 |
| 5,810,518 A | * | 9/1998 | Wiman et al. ............... 407/102 |
| 5,836,723 A | * | 11/1998 | Von Haas et al. ........... 407/102 |
| 6,004,081 A | * | 12/1999 | Hellstrom et al. ........... 407/103 |

FOREIGN PATENT DOCUMENTS

JP  6-155110  6/1994

* cited by examiner

Primary Examiner—Jacob K. Ackun, Jr.
(74) Attorney, Agent, or Firm—Womble Carlyle

(57) ABSTRACT

The present invention provides a cutting tool assembly having a cutting insert holder and a cutting insert. The cutting insert holder has a clamping jaw, a base jaw and an inner side surface extending therebetween. An insert pocket is defined between the two jaws and the inner side surface. The inner side surface is provided with a positioning member. A clamping screw passes through the upper clamping jaw and is threadingly connected to the lower clamping jaw. The cutting insert has a central body portion having a side surface provided with a location member which is engaged by the positioning member whereby the axial location of the cutting insert is fixed.

31 Claims, 5 Drawing Sheets

CUTTING TOOL ASSEMBLY

FIELD OF THE INVENTION

The present invention relates to a cutting tool assembly having an indexable cutting insert and more particularly to a cutting tool assembly for grooving operations in which the cutting insert is mechanically clamped.

BACKGROUND OF THE INVENTION

In such cutting tool assemblies the cutting insert is retained in an insert pocket defined between clamping surfaces of upper and lower jaws of the insert holder, generally referred to as clamping and base jaws, respectively. The insert holder can be a one-piece tool, or, the clamping jaw can be a separate member. In both cases, at least one screw is used for forcing the two jaws towards each other for secure retention of the cutting insert.

In order to uniquely determine the axial location of the cutting insert an axial stop is provided in the insert pocket. In some prior art cutting tool assemblies the stop is located on one of the clamping surfaces of the upper and lower clamping jaws. In such cases, the cutting insert has to be designed with an appropriate protrusion or recess, on the corresponding insert clamping abutment surface, for engaging the stop. In other prior art cutting tool assemblies, the stop is located at the rear of the insert pocket and the axial location of the cutting insert is fixed when a section of the rear surface of the cutting insert abuts the stop. This arrangement has two disadvantages. First, it restricts the shape of the rear surface of the cutting insert. For double-ended grooving cutting inserts the rear surface is the non-operative front relief surface. Hence, this arrangement restricts the shape of the front relief surface of the cutting insert. Second, if the end portion of the cutting insert, associated with the operative cutting edge, were to break during a cutting operation, the section of the relief surface which would abut the stop on indexing the cutting insert, may well become damaged, in which case the cutting insert could not be indexed, preventing use of the cutting edge associated with the non-damaged end portion of the cutting insert.

To stabilize the cutting insert in the direction perpendicular to the axial direction, the clamping abutment surfaces of the cutting insert are formed with V-shaped protrusions (or grooves) and the clamping surfaces of the insert holder's jaws are formed with matching V-shaped grooves (or protrusions). According to some embodiments of such cutting tool assemblies, the cutting inserts have a stop-engaging protrusion (or recess) on one of their clamping abutment surfaces and the insert holders having a corresponding stop-engaging recess (or protrusion) on one of the clamping surfaces of one of their clamping jaws. The presence of such stop-engaging protrusions (or recesses) can be disadvantageous.

It is an object of the present invention to provide a double-ended grooving cutting insert that substantially overcomes the above mentioned disadvantages.

It is also an object of the present invention to provide an insert holder for retaining the above-mentioned grooving cutting insert.

SUMMARY OF THE INVENTION

In accordance with the present invention there is provided a cutting insert comprising a central body portion extending between two opposite end portions, each end portion being provided with a cutting edge; the central body portion being provided with upper and lower clamping abutment surfaces with first and second side surfaces extending therebetween; at least one of the first and second side surfaces being provided with an axial location member.

In accordance with one embodiment, the axial location member is a protrusion.

Generally, the protrusion is square shaped.

In accordance with another embodiment of the present invention, the axial location member is a recess.

Preferably, the upper and lower clamping abutment surfaces are sloped, defining therebetween a variable distance, so that when the cutting insert is viewed in an end view the distance between the upper and lower clamping abutment surfaces is a maximum at the first side surface and a minimum at the second side surface.

If desired, the upper and lower clamping abutment surfaces have the form of V-shaped protrusions.

Further if desired, the upper and lower clamping abutment surfaces have the form of V-shaped grooves.

There is also provided in accordance with the present invention a cutting tool assembly comprising:

a cutting insert holder; and a cutting insert;

the cutting insert holder comprising:

an upper clamping jaw having an upper clamping surface;

a lower base jaw having a lower clamping surface;

at least one clamping screw passing through the upper clamping jaw and threadingly connected to the lower base jaw;

an insert holder inner side surface extending between the upper and lower clamping surfaces;

an insert pocket bound on two opposite sides by the upper and lower clamping surfaces and bound on a third side extending between the two opposite sides by the insert holder inner side surface; the insert holder inner side surface being provided with a positioning member;

the cutting insert comprising:

a central body portion extending between two opposite end portions, each end portion being provided with a cutting edge; the central body portion being provided with upper and lower clamping abutment surfaces with first and second side surfaces extending therebetween; at least one of the first and second side surfaces being provided with an axial location member;

wherein the upper clamping abutment surface abuts the upper clamping surface, the lower clamping abutment surface abuts the lower clamping surface and the positioning member engages the axial location member whereby the axial location of the cutting insert is fixed.

In accordance with one embodiment, the axial location member is a protrusion and the positioning member is a rear surface of a recess in the insert holder inner side surface.

Generally, the protrusion is square shaped and the recess has a generally matching square shaped cross section.

In accordance with another embodiment, the axial location member is a recess and the positioning member is a protrusion on the insert holder inner side surface.

Preferably, the upper and lower clamping abutment surfaces are sloped, defining therebetween a variable distance, so that when the cutting insert is viewed in an end view the distance between the upper and lower clamping abutment surfaces is a maximum at the first side surface and a minimum at the second side surface and the upper and lower clamping surfaces of the upper clamping jaw and the lower base jaw, respectively, are matchingly sloped.

If desired, the upper and lower clamping abutment surfaces have the form of V-shaped protrusions and the upper and lower clamping surfaces of the upper clamping jaw and the lower base jaw, respectively, have the form of matching V-shaped grooves.

Further if desired, the upper and lower clamping abutment surfaces have the form of V-shaped grooves and the upper and lower clamping surfaces of the upper clamping jaw and the lower base jaw, respectively, have the form of matching V-shaped protrusions.

BRIEF DESCRIPTION OF THE DRAWINGS

For a better understanding the invention will now be described, by way of example only, with reference to the accompanying drawings in which:

FIG. 4b is a cross-sectional view along line IVb—IVb in FIG. 4a;

FIG. 6b is a side view of the cutting insert shown in FIGS. 5 and 6a;

FIG. 10b is a side view of the cutting insert shown in FIG. 10a;

FIG. 11b is a side view of the cutting insert shown in FIG. 11a.

DETAILED DESCRIPTION OF THE INVENTION

Figure 1:
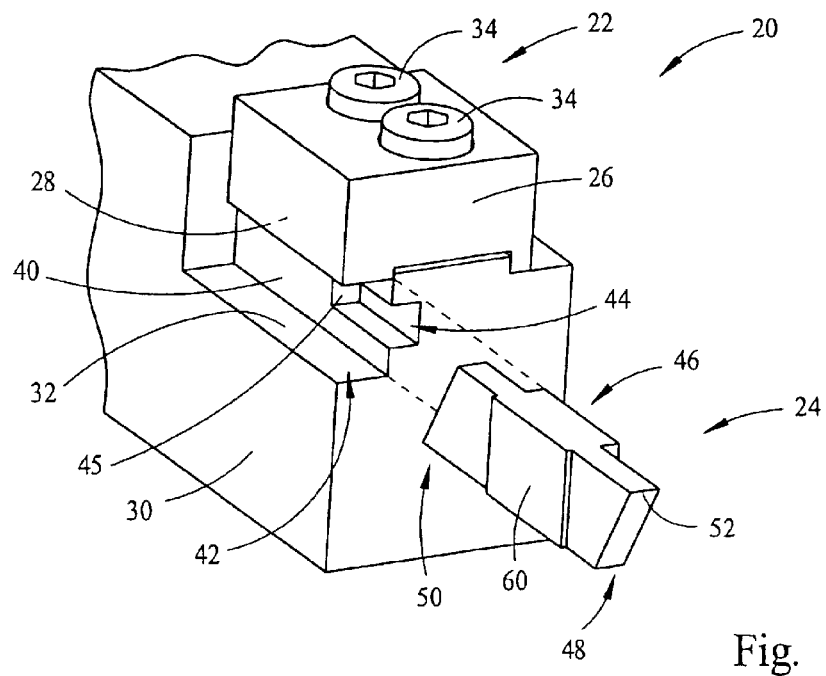
FIG. 1 is a right perspective view of a cutting tool assembly in accordance with one preferred embodiment of the present invention with the cutting insert removed from the insert holder.

Attention is first drawn to FIGS. 1 to 4c, showing a cutting tool assembly 20 in accordance with the present invention comprising a cutting insert holder 22 and a cutting insert 24. The cutting insert holder 22 comprises an upper clamping jaw 26 having an upper clamping surface 28 and a lower base jaw 30 having a lower clamping surface 32. Two clamping screws 34 are used to securely clamp the cutting insert 24 between the upper and lower clamping surfaces. Each clamping screw 34 passes through a through bore 36 in the upper clamping jaw 26 and is threadingly connected to the lower clamping jaw via a threaded bore 38 in the lower base jaw 30. Between the upper and lower clamping surfaces extends an insert holder inner side surface 40. An insert pocket 42, for receiving and retaining the cutting insert 24, is bound on two opposite sides by the upper and lower clamping surfaces and on a third side, extending between the two opposite sides, by the insert holder inner side surface 40. The insert holder inner side surface is provided with a recess 44 having a rear surface 45 forming a positioning member for the determination of the axial location of the cutting insert.

The cutting insert 24 comprises a central body portion 46 extending between two opposite end portions 48, 50, the end portions being provided with cutting edges 52. The central body portion 46 has upper and lower clamping abutment surfaces 54, 56 with first and second side surfaces 58, 60, extending therebetween. The first side surface 58 is provided with a protrusion 62 forming an axial location member for the cutting insert. The protrusion 62, in the embodiment shown, is square shaped and the recess 44 has a matching square shaped cross section for receiving the protrusion 62.

Figure 2:
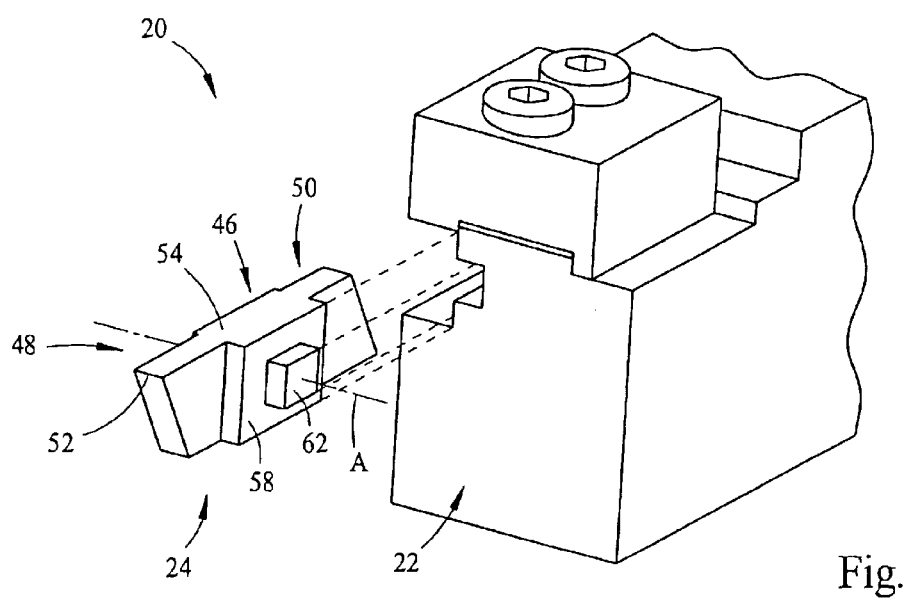
FIG. 2 is a left perspective view of the cutting tool assembly shown in FIG. 1.

As seen in FIGS. 1 and 2, the recess 44 and the protrusion 62 are shaped so as to permit sliding insertion and removal of the cutting insert 24 along a longitudinal direction of the cutting insert. As best seen in FIG. 2, the protrusion 62 is surrounded on all sides by the first side surface 58 and so is spaced apart from the upper and lower clamping abutment surfaces 54, 56. Furthermore, the recess 44 preferably opens to the front end of the cutting insert holder.

When the cutting tool assembly is assembled, the upper clamping abutment surface 54 of the cutting insert 24 abuts the upper clamping surface 28 of the upper clamping jaw 26, the lower clamping abutment surface 56 of the cutting insert abuts the lower clamping surface 32 of the base jaw 30 and the protrusion 62 engages the rear surface 45 of the recess 44, whereby the axial location of the cutting insert 24 is fixed.

Figure 3A:
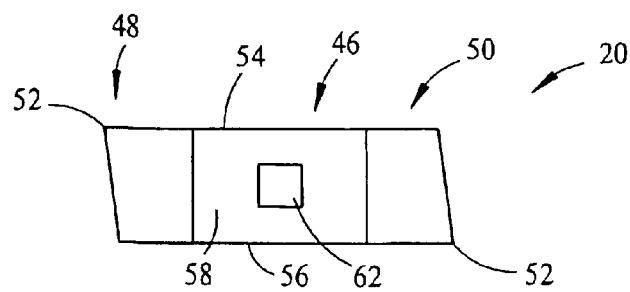
FIG. 3a is a side view of the cutting insert shown in FIGS. 1 and 2.
Figure 3B:
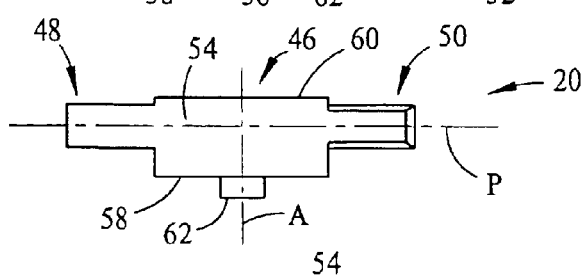
FIG. 3b is a top view of the cutting insert shown in FIGS. 1 and 2.
Figure 3C:
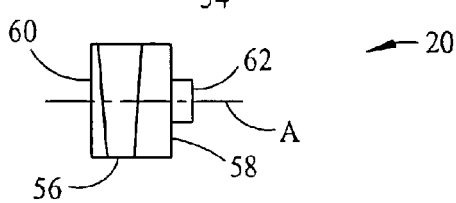
FIG. 3c is a front view of the cutting insert shown in FIGS. 1 and 2.
Figure 4A:
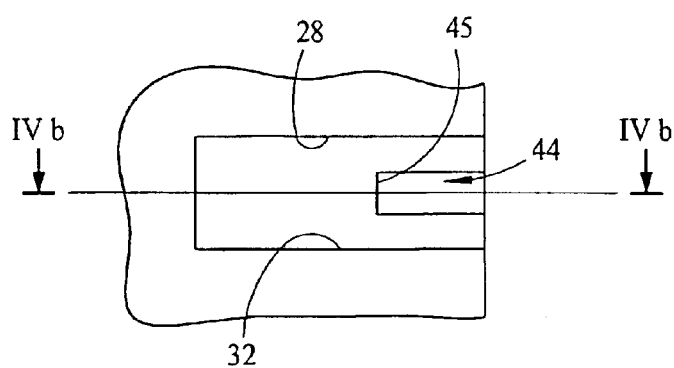
FIG. 4a is a partial side view of the insert holder shown in FIGS. 1 and 2.
Figure 4B:
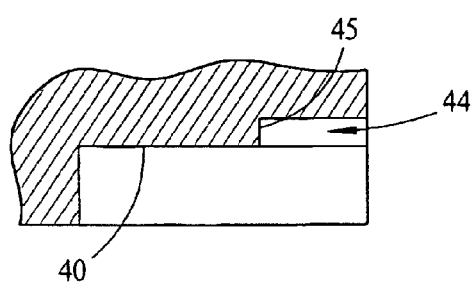
Figure 4C:
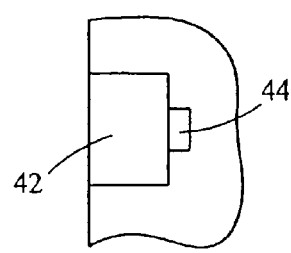
FIG. 4c is a partial front view of the insert holder shown in FIGS. 1 and 2.

It should be noted that the cutting insert 24 has 180° rotational symmetry about an axis perpendicular to a longitudinal plane P of the cutting insert and passing through the center of the protrusion 62. Hence, for a given orientation of the cutting insert, as best seen in FIG. 3a, one of the cutting edges 52 is an upper cutting edge, associated with the upper clamping abutment surface 54, whilst the other cutting edge 52 is a lower cutting edge, associated with the lower clamping abutment surface 56. Clearly, as best seen in FIGS. 1 and 2, the upper cutting edge is the operative cutting edge.

It should further be noted that since the present invention is directed to the axial location of the cutting insert and not to its specific shape or function, the cutting edges and the associated rake and relief surfaces are only shown schematically and it will be apparent that any required form of rake and relief surface and associated cutting edge can be used.

Figure 5:
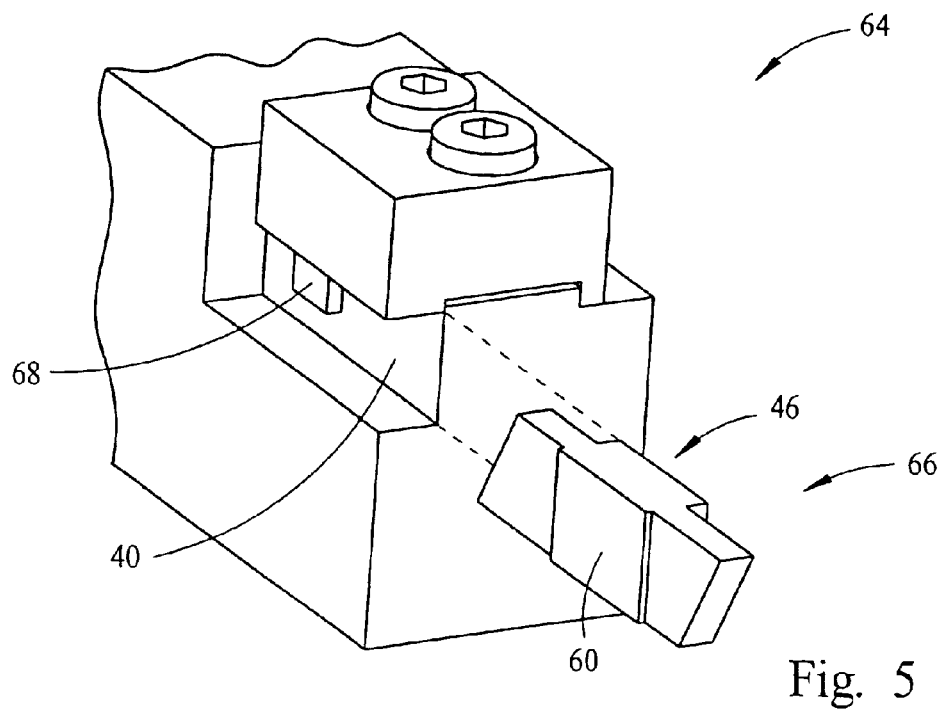
FIG. 5 is a right perspective view of a cutting tool assembly in accordance with another preferred embodiment of the present invention with the cutting insert removed from the insert holder.
Figure 6A:
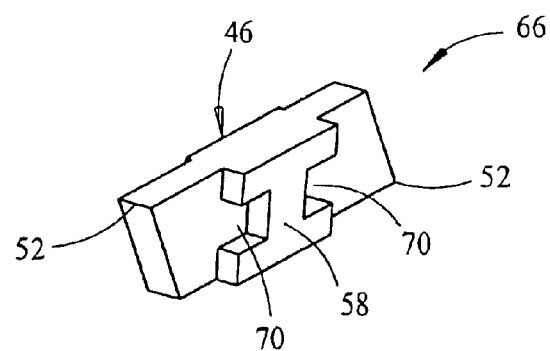
FIG. 6a is left perspective view of the cutting insert shown in FIG. 5.
Figure 6B:
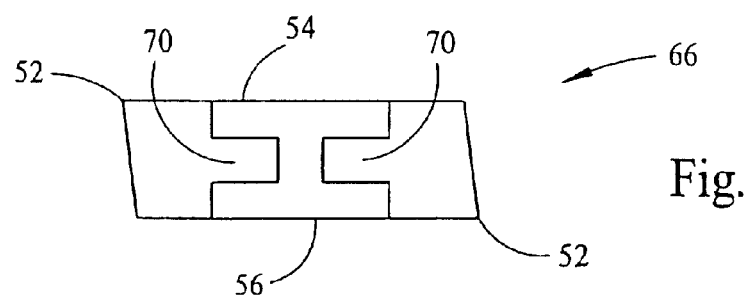

Attention is now drawn to FIGS. 5 to 6b showing a cutting insert holder 64 and an associated cutting insert 66 in accordance with another embodiment of the present invention. In this embodiment the axial location of the cutting insert 66 is determined by the engagement of a protrusion 68 on the insert holder inner side surface 40 by a recess 70 in the first side surface 58 of the central body portion 46 of the cutting insert. As shown in FIGS. 5 to 6b, there are two recesses 70 on the first side surface 58 of the central body portion 46. Therefore, as with the above described first embodiment, the cutting insert has 180° rotational symmetry about an axis passing through the geometrical center of the side surfaces 58, 60 of the central body portion 46 and perpendicular to a longitudinal plane of the cutting insert 66. Hence, for a given orientation of the cutting insert, as best seen in FIG. 6b (which is similar to FIG. 3a), one of the cutting edges 52 is an upper cutting edge, associated with the upper clamping abutment surface 54, whilst the other cutting edge 52 is a lower cutting edge, associated with the lower clamping abutment surface 56.

As best seen in FIGS. 6a–6b, recess 70 is spaced apart from the upper and lower clamping abutment surfaces 54, 56. Moreover, recess 70 is open in a longitudinal direction of the cuffing insert defined between the cutting ends. Accordingly, the recess 70 and the protrusion 68 formed on the insert holder inner side surface 40 are shaped so as to permit sliding insertion and removal of the cuffing insert into the insert holder, along said longitudinal direction.

Figure 7:
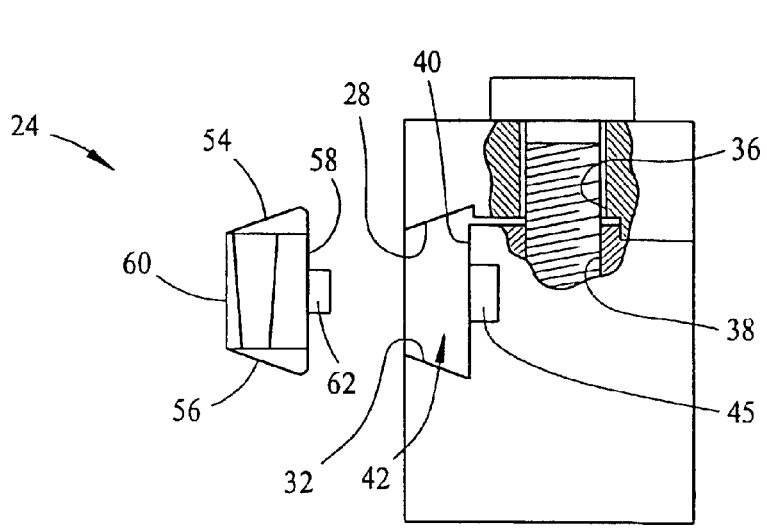
FIG. 7 is a side view of a cutting tool assembly in accordance with the present invention with the cutting insert removed from the insert holder, the clamping abutment surfaces of the cutting insert are sloped and the clamping surfaces of the insert holder's jaws are formed with matching slopes.
Figure 8:
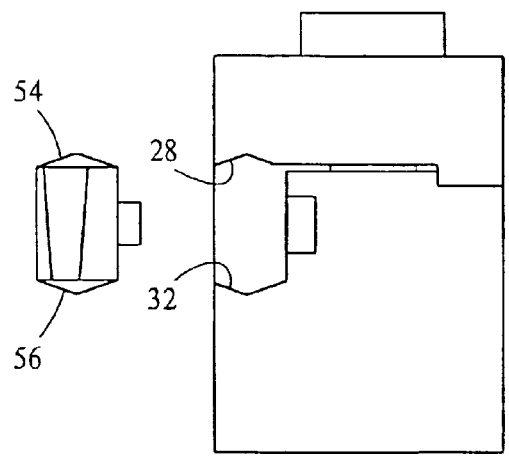
FIG. 8 is a side view of a cutting tool assembly in accordance with the present invention with the cutting insert removed from the insert holder, the clamping abutment surfaces of the cutting insert are formed with V-shaped protrusions and the clamping surfaces of the insert holder's jaws are formed with matching V-shaped grooves.
Figure 9:
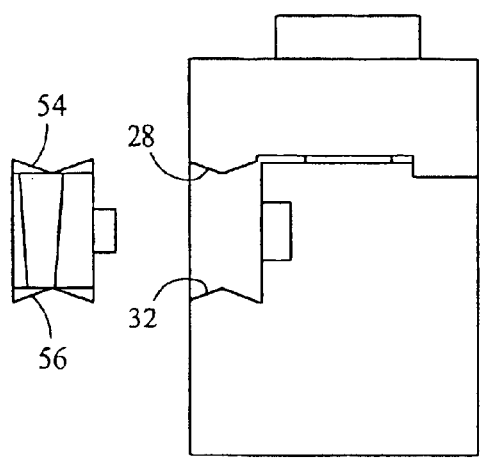
FIG. 9 is a side view of a cutting tool assembly in accordance with the present invention with the cutting insert removed from the insert holder, the clamping abutment surfaces of the cutting insert are formed with V-shaped grooves and the clamping surfaces of the insert holder's jaws are formed with matching V-shaped or protrusions.

In the embodiments shown in FIGS. 1 to 6b, the geometry of the upper and lower clamping abutment surfaces 54, 56 is not detailed and these surfaces are shown schematically to be flat and parallel. FIGS. 7 to 9 show different possible geometries for the upper and lower clamping abutment surfaces. Although these geometries are exemplified for the embodiment of the invention shown in FIGS. 1 to 4c, they apply equally well to the embodiment of the invention shown in FIGS. 5 to 6b. Preferably, as shown in FIG. 7, the upper and lower clamping abutment surfaces 54, 56 are sloped so that when the cutting insert is viewed in an end view the distance between them is a maximum at the first side surface 58 and a minimum at the second side surface 60. The upper and lower clamping surfaces 28, 32 of the upper clamping jaw 26 and the lower base jaw 30, respectively, have matching slopes. Hence, when the cutting insert 24 is clamped in the insert pocket 42 of the cutting insert holder 22, the upper clamping abutment surface 54 of the cutting insert abuts the upper clamping surface 28 of the upper clamping jaw 26, the lower clamping abutment surface 56 of the cutting insert abuts the lower clamping surface 32 of the lower base jaw 30, the protrusion 62 on the first side 58 of the central body portion 46 of the cutting insert abuts the rear surface 45 of the recess 44 and the first side surface 58 abuts the insert holder side surface 40.

If desired, as shown in FIG. 8, the upper and lower clamping abutment surfaces 54, 56 have the form of V-shaped protrusions and the upper and lower clamping surfaces 28, 32 of the upper clamping jaw 26 and the lower base jaw 30, respectively, have the form of matching V-shaped grooves.

Further if desired, as shown in FIG. 9, the upper and lower clamping abutment surfaces 54, 56 have the form of V-shaped grooves and the upper and lower clamping surfaces 28, 32 of the upper clamping jaw 26 and the lower base jaw 30, respectively, have the form of matching V-shaped protrusions.

Figure 10A:
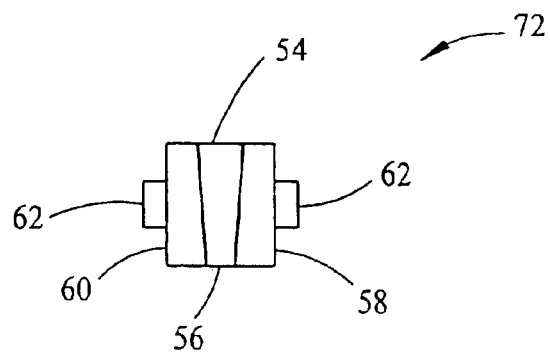
FIG. 10a is a front view of a cutting insert having a protrusion on each of the side surfaces of the central body portion.
Figure 10B:
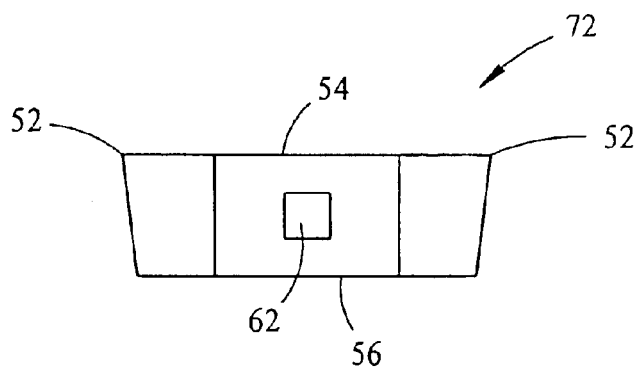
Figure 11A:
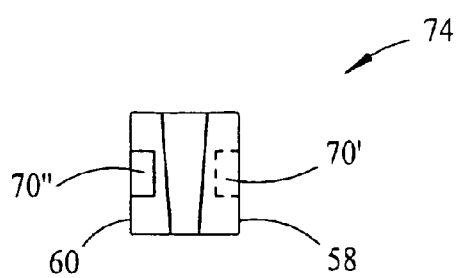
FIG. 11a is a front view of a cutting insert having a recess in each of the side surfaces of the central body portion.
Figure 11B:
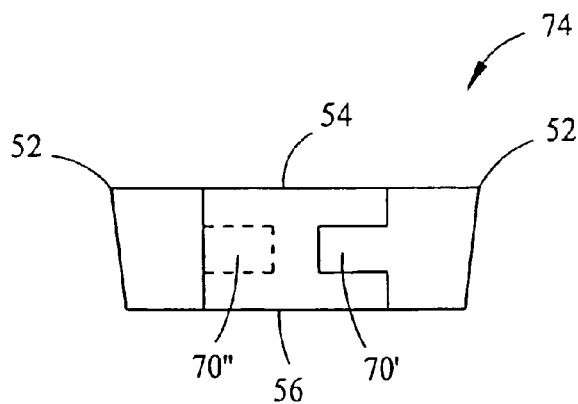

The cutting inserts 24, 66 described above have axial location members only on one side surface 58 of the central body portion 46. As a result, for a given orientation of the cutting insert, one of the cutting edges 52 is an upper cutting edge, associated with the upper clamping abutment surface 54, whilst the other cutting edge 52 is a lower cutting edge, associated with the lower clamping abutment surface 56. Attention is now drawn to FIGS. 10a to 11b. FIGS. 10a and 10b show a cutting insert 72 having two protrusions 62 both constituting axial location members. One protrusion 62 is on the first side surface 58 and the other protrusion 62 is on the second side surface 60. As seen in FIG. 10b, both cutting edges 52 are upper cutting edges, associated with the upper clamping abutment surface 54. Similarly, FIGS. 11a and 11b show a cutting insert 74 having two axial location members 70', 70", both recesses. One recess 70' is on the first side surface 58 and the other recess 70" is on the second side surface 60. The dashed lines represent a hidden recess. As seen in FIG. 11b, both cutting edges 52 are upper cutting edges associated with the upper clamping abutment surface 54.

Although the present invention has been described to a certain degree of particularity, it should be understood that various alterations and modifications can be made without departing from the spirit or scope of the invention as hereinafter claimed. For example, the shape of the axial location member of the cutting insert and the positioning member of the cutting insert holder do not necessarily have to be square shaped, they can be round, elliptical or any other convenient shape.

What is claimed is:

1. A cutting insert comprising a central body portion extending between two opposite end portions, each end and lower clamping abutment surfaces with first and second side surfaces extending therebetween; at least one of the first and second side surfaces being provided with an axial location member, the axial location member being a protrusion, wherein the protrusion is square shaped.

2. A cutting insert in accordance with claim 1, having a 180° rotational symmetry about an axis perpendicular to a longitudinal plane (P) of the cutting insert and passing through the center of the protrusion.

3. A cutting insert comprising a central body portion extending between two opposite end portions, each end portion being provided with a cutting edge; the central body portion being provided with upper and lower clamping abutment surface with first and second side surfaces extending therebetween; at least one of the first end second side surfaces being provided with an axial location member, the axial location member being a protrusion, wherein the upper and lower clamping abutment surfaces are sloped, defining therebetween a variable distance so that when the cutting insert is viewed in an end view the distance between the upper and lower clamping abutment surfaces is a maximum at the first side surface and a minimum at the second side surface.

4. A cutting insert comprising a central body portion extending between two opposite end portions, each end portion being provided with a cutting edge; the central body portion being provided with upper and lower clamping abutment surfaces with first and second side surface extending therebetween; at least one of the first and second side surfaces being provided with an axial location member, the axial location member being a protrusion, wherein the upper and lower clamping abutment surfaces have the form of V-shaped protrusions.

5. A cutting insert comprising a central body portion extending between two opposite end portions, each end portion being provided with a cutting edge; the central body portion being provided with upper and lower clamping abutment surfaces with first and second side surfaces extending therebetween; at least one of the first and second side surfaces being provided with an axial location member, the axial location member being a protrusion, wherein the upper and lower clamping abutment surfaces have the form of V-shaped grooves.

6. A cutting tool assembly comprising:
a cutting insert holder; and
a cutting insert;
the cutting insert holder comprising:
an upper clamping jaw having an upper clamping surface;
a lower base jaw having a lower clamping surface;
an insert holder inner side surface extending between the upper and lower clamping surfaces; and
an insert pocket bound on two opposite sides by the upper and lower clamping surfaces and bound on a third side extending between the two opposite sides by the insert holder inner side surface; the insert holder inner side surface being provided with a positioning member;
the cutting insert comprising:
a central body portion extending in a longitudinal direction of the cutting insert between two opposite end portions, each end portion being provided with a cutting edge, the central body portion being provided with upper and lower clamping abutment surfaces with first and second side surfaces extending therebetween; at least one of the first and second side surfaces being provided with an axial location member;
wherein the upper clamping abutment surface is configured to abut the upper clamping surface; the lower clamping abutment surface is configured to abut the lower clamping surface and the positioning member is configured to engage the axial location member to thereby fix the axial location of the cutting insert; and
wherein the axial location member is a protrusion and the positioning member is a rear surface of a recess in the insert holder inner side surface, the protrusion and the recess being shaped so as to permit sliding insertion and removal of the cutting insert into the insert holder, along the longitudinal direction of the cutting insert.

7. A cutting tool assembly in accordance with claim 6, wherein the protrusion is square-shaped.

8. A cutting tool assembly in accordance with claim 6, wherein the cutting insert has a 180° rotational symmetry about an axis perpendicular to a longitudinal plane (P) of the cutting insert and passing through the center of the protrusion.

9. A cutting tool assembly in accordance with claim 6, wherein the upper and lower clamping abutment surfaces are sloped, defining therebetween a variable distance, so that when the cutting insert is viewed in an end view the distance between the upper and lower clamping abutment surfaces is a maximum at the first side surface and a minimum at the second side surface and the upper and lower clamping surfaces of the upper clamping jaw and the lower base jaw, respectively, are matchingly sloped.

10. A cutting tool assembly in accordance with claim 6, wherein the upper and lower clamping abutment surfaces have the form of V-shaped protrusions and the upper and lower clamping surfaces of the upper clamping jaw and the lower clamping jaw, respectively, have the form of matching V-shaped grooves.

11. A cutting tool assembly in accordance with claim 6, wherein the upper and lower clamping abutment surfaces have the form of V-shaped grooves and the upper and lower clamping surfaces of the upper clamping jaw and the lower clamping jaw, respectively, have the form of matching V-shaped protrusions.

12. A cutting tool assembly in accordance with claim 6, wherein the protrusion is spaced apart from the upper and lower clamping abutment surfaces.

13. A cutting toot assembly in accordance with claim 6, wherein both the first and second side surfaces of the cutting insert are provided with a protrusion.

14. A cutting insert in accordance with claim 1, wherein the protrusion is spaced apart from the upper and lower clamping abutment surfaces.

15. A cutting insert comprising a central body portion extending between two opposite end portions, each end portion being provided with a cutting edge; the central body portion being provided with upper and lower clamping abutment surfaces with first and second side surfaces extending therebetween; wherein both the first and second side surfaces are provided with axial location members, each axial location member being a protrusion.

16. A cutting insert comprising a central body portion extending in a longitudinal direction of the cutting insert between two opposite end portions, each end portion being provided with a cutting edge; the central body portion being provided with upper and lower clamping abutment surfaces with first and second side surfaces extending therebetween; at least one of the first and second side surfaces being provided with an axial location member formed as an axially directed recess open in said longitudinal direction.

17. A cutting insert in accordance with claim 16, wherein the axially directed recess is spaced apart from the upper and lower clamping abutment surfaces.

18. A cutting insert in accordance with claim 16, wherein both the first and second side surfaces are provided with an axially directed recess.

19. A cutting insert in accordance with claim 16, wherein said at least one of the first and second side surfaces is provided with two axially directed recesses facing in opposite directions.

20. A cutting tool assembly comprising:
a cutting insert holder, and
a cutting insert;
the cutting insert holder comprising:
an upper clamping jaw having an upper clamping surface;
a lower base jaw having a lower clamping surface;
an insert holder inner side surface extending between the upper and lower clamping surfaces; and
an insert pocket bound on two opposite sides by the upper and lower clamping surfaces and bound on a third side extending between the two opposite sides by the insert holder inner side surface; the insert holder inner side surface being provided with a positioning member;
the cutting insert comprising:
a central body portion extending in a longitudinal direction of the cutting insert between two opposite end portions, each end portion being provided with a cutting edge; the central body portion being provided with upper and lower clumping abutment surfaces with first and second side surfaces extending therebetween; at least one of the first and second side surfaces being provided with an axial location member;

wherein the upper clamping abutment surface is configured to abut the upper clamping surface; the lower clamping abutment surface is configured to abut the lower clamping surface and the positioning member is configured to engage the axial location member to thereby fix the axial location of the cutting insert, and wherein the axial location member is an axially directed recess open in said longitudinal direction and the positioning member is a protrusion on the insert holder inner side surface, the axially directed recess and the protrusion being shaped so as to permit sliding insertion and removal of the cutting insert into the insert holder, along said longitudinal direction.

21. A cutting tool assembly in accordance with claim 20, wherein the axially directed recess is spaced apart from the upper and lower clamping abutment surfaces.

22. A cutting tool assembly in accordance with claim 20, wherein both the first and second side surfaces are provided with an axially directed recess.

23. A cutting tool assembly in accordance with claim 20, wherein said at least one of the first and second side surfaces is provided with two axially directed recesses facing in opposite directions.

24. A cutting insert comprising a central body portion extending in a longitudinal direction of the cutting insert between two opposite end portions, each end portion being provided with a cutting edge; the central body portion being provided with sloped upper and lower clamping abutment surfaces which define therebetween a variable distance, the sloped upper and lower clamping abutment surfaces having first and second side surfaces extending therebetween; at least one of the first and second side surfaces being provided with an axial location member, wherein the axial location member is shaped so as to permit insertion of the cutting insert along said longitudinal direction.

25. A cutting insert in accordance with claim 24, wherein, when the cutting insert is viewed in an end view, the distance between the upper and lower clamping abutment surfaces is a maximum at the first side surface and a minimum at the second side surface.

26. A cutting insert in accordance with claim 24, wherein the upper and lower clamping abutment surfaces have the form of V-shaped protrusions.

27. A cutting insert in accordance with claim 24, wherein the upper and lower clamping abutment surfaces have the form of V-shaped grooves.

28. A cutting tool assembly comprising:

a cutting insert holder; and a cutting insert;

the cutting insert holder comprising:

an upper clamping jaw having an upper clamping surface;

a lower base jaw having a lower clamping surface;

an insert holder inner side surface extending between the upper and lower clamping surfaces; and an insert pocket bound on two opposite sides by the upper and lower clamping surfaces and bound on a third side extending between the two opposite sides by the insert holder inner side surface; the insert holder inner side surface being provided with a positioning member;

the cutting insert comprising:

a central body portion extending in a longitudinal direction of the cutting insert between two opposite end portions, each end portion being provided with a cutting edge; the central body portion being provided with sloped upper and lower clamping abutment surfaces which define therebetween a variable distance, the sloped upper and lower clamping abutment surfaces having first and second side surfaces extending therebetween; at least one of the first and second side surfaces being provided with an axial location member, wherein the upper clamping abutment surface is configured to abut the upper clamping surface; the lower clamping abutment surface is configured to abut the lower clamping surface and the positioning member is configured to engage the axial location member to thereby fix the axial location of the cutting insert; and wherein the axial location member and the positioning member are shaped so as to permit sliding insertion and removal of the cutting insert into the insert holder, along said longitudinal direction.

29. A cutting insert in accordance with claim 28, wherein, when the cutting insert is viewed in an end view, the distance between the upper and lower clamping abutment surfaces is a maximum at the first side surface and a minimum at the second side surface.

30. A cutting insert in accordance with claim 28, wherein the upper and lower clumping abutment surfaces have the form of V-shaped protrusions.

31. A cutting insert in accordance with claim 28, wherein the upper and lower clamping abutment surfaces have the form of V-shaped grooves.

* * * * *

UNITED STATES PATENT AND TRADEMARK OFFICE
CERTIFICATE OF CORRECTION

PATENT NO. : 6,758,637 B2
DATED : July 6, 2004
INVENTOR(S) : Uzi Gati

It is certified that error appears in the above-identified patent and that said Letters Patent is hereby corrected as shown below:

Column 6,
Lines 36-44, Claim 1 should read as follows:

1. A cutting insert comprising a central body portion extending between two opposite end portions, each end portion being provided with a cutting edge; the central body portion being provided with upper and lower clamping abutment surfaces with first and second side surfaces extending therebetween; at least one of the first and second side surfaces being provided with an axial location member, the axial location member being a protrusion, wherein the protrusion is square shaped.

Signed and Sealed this

Twenty-first Day of December, 2004

JON W. DUDAS
*Director of the United States Patent and Trademark Office*